United States Patent [19]

Cheng

[11] Patent Number: 5,923,744
[45] Date of Patent: Jul. 13, 1999

[54] INTERCEPTING CALL COMMUNICATIONS WITHIN AN INTELLIGENT NETWORK

[75] Inventor: Jing Cheng, Plano, Tex.

[73] Assignee: Ericsson Inc., Research Triangle Park, N.C.

[21] Appl. No.: 08/847,525

[22] Filed: Apr. 24, 1997

[51] Int. Cl.⁶ .................................................. H04M 1/24
[52] U.S. Cl. ........................... 379/207; 379/35; 379/220; 379/230
[58] Field of Search ................................ 379/34, 35, 112, 379/114, 201, 207, 220, 221, 229, 230

[56] References Cited

U.S. PATENT DOCUMENTS

| | | | |
|---|---|---|---|
| 5,471,519 | 11/1995 | Howe et al. | 379/35 |
| 5,590,171 | 12/1996 | Howe et al. | 379/34 |
| 5,790,798 | 8/1998 | Beckett, II et al. | 379/34 |

*Primary Examiner*—Daniel S. Hunter
*Attorney, Agent, or Firm*—Jenkens & Gilchrist

[57] ABSTRACT

A first service control point (SCP) for providing law enforcement related call interception capability and a second SCP for providing conventional Intelligent Network (IN) subscriber service features are both provided within an IN based telecommunications network. Two types of trigger flags are then associated with a service switching point (SSP) serving a particular subscriber. Where a first trigger flag associated with call interception is set, a query signal requesting interception routing instructions is transmitted from the serving SSP to the first SCP using a pre-stored network address. Where a second trigger flag associated with an IN service is set, a query signal requesting IN service routing instructions is transmitted from the serving SSP to the second SCP using a directory number associated with the associated subscriber.

19 Claims, 5 Drawing Sheets

INTERCEPTING CALL COMMUNICATIONS WITHIN AN INTELLIGENT NETWORK

BACKGROUND OF THE INVENTION

1. Technical Field of the Invention

The present invention relates to a telecommunications network and, in particular, to the interception of originating and terminating call connections within an Intelligent Network (IN) based telecommunications network.

2. Description of Related Art

With the promulgation of the Communications Assistance for Law Enforcement Act (CALEA) on Oct. 25, 1994, each telecommunications carrier (service provider) "shall ensure that its equipment, facilities, or services that provide a customer or subscriber with the ability to originate, terminate, or direct communications are capable of (1) expeditiously isolating and enabling the government, pursuant to a court order or other lawful authorization, to intercept, to the exclusion of any other communications, all wire and electronic communications carried by the carrier within a service area to or from equipment, facilities, or services of a subscriber. . ." (47 U.S.C. § 1002). Accordingly, a telecommunications switch must enable a law enforcement agency to intercept a call connection effectuated for a particular associated subscriber. Such a capability further must be provided within four years from the date of enactment of the relevant Act (i.e., by October, 1998).

Reference is now made to FIG. 1 which is a block diagram of a telecommunications network illustrating a call screening of an incoming call connection in a conventional telecommunications switch. A calling party subscriber, such as a wireline calling party terminal 10, originates a call connection towards a particular called party subscriber 40 by dialing a directory number associated therewith. An originating telecommunications switch 20 serving the calling party subscriber then transmits a call setup signal, such as an Integrated Service Digital Network User Part (ISUP) based Initial Address Message (IAM) 50, utilizing the dialed directory number as the called party number and the directory number associated with the calling party subscriber as the calling party number. The IAM signal 50 is then transmitted over a connected Signaling System No. 7 (SS7) telecommunications network and delivered to a terminating switch 30 serving the called party subscriber 40. Responsive thereto, a circuit connection 60 capable of transporting voice and/or data is established between the originating switch 20 and the terminating switch 30.

A traffic control system (TCS) 70 associated with the terminating exchange 30, for example, extracts the received called party number from the IAM signal 50 and determines whether the subscriber associated with the extracted number needs to be monitored or screened. As an illustration, the called party number is compared against data stored at an associated register (R) 80. A match of the called party number to a number stored in the register 80 is indicative of the fact that the called party subscriber needs to be monitored by a particular law enforcement agency. An application module 90 responds to the match by effectuating a circuit or data communication link 110 with a law enforcement administration function (LEAF) 100 indicated in the register (R) 80 to monitor the call. The LEAF 100 is further provided with call identification information including the calling party directory number, called party directory number, the direction of the call, etc. Concurrently, another circuit connection is effectuated toward the called party subscriber 40. The associated called party terminal 40 is then alerted (with a ring) and a speech connection is established with the calling party subscriber 10. As a result, the connected LEAF 100 is able to intercept and to monitor the communication between the calling party subscriber 10 and the called party subscriber 40.

As illustrated above, monitoring in a conventional switch requires that called party directory numbers for all incoming call connections and calling party directory numbers for all outgoing call connections effectuated through that particular switch are reviewed and evaluated against the data stored in the register (R) 80. This monitoring is extremely inefficient because very few subscribers are typically marked for law enforcement monitoring at any give time. As an illustration, for the city of New York, authorities have estimated that an average of five hundred twenty three (523) of the eighteen million subscribers within the city are marked for monitoring. Consequently, each and every call connections terminated toward and originated by the eighteen million subscribers need to be inefficiently screened in order to monitor the five hundred twenty three subscribers.

Even with the introduction of a new telecommunications architecture known as an Intelligent Network (IN), some of inefficiency and inconvenience in law enforcement agency monitoring still exist. Reference is now made to FIG. 2 illustrating an Intelligent Network (IN) 200 providing IN services. The basic concept behind IN is to move the intelligence out of each local exchange or Service Switching Point (SSP) 210 and to centralize the services providing the intelligence in a Service Control Point (SCP) 220. By centralizing the special subscriber services in the SCP 220, a new service can be added in only one place (i.e., the SCP) and provided to all subscribers connected to the multiple SSPs 210. Accordingly, one SSP 210 services multiple telecommunications subscribers or terminals 40, and one SCP 220 services multiple SSPs 210 or local switches. The interfaces between the SSPs 210 and SCPs 220 are established via links 240 utilizing Signaling System No. 7 (SS7) Transaction Capabilities Application Part (TCAP), or other Signaling Control Connection Part (SCCP) based application layer protocols. More specifically, Intelligent Network Application Protocols (INAPs) sit on top of the TCAP protocols to establish a control dialogue between the SSPs 210 and the SCP 220. Furthermore, in order to multiplex a plurality of SCPs 220 with a plurality of SSPs 210, a signal transfer point (STP) 230 is interfaced therebetween to properly route and to deliver data and signals. Signal links connected between an SSP 210 and a STP 230 are effectuated via dual links (e.g., 240A–240B). This is to ensure that when and if a first link or STP fails, another alternative route or node is still available for delivering signals to a designated SCP 220.

Utilizing the above architecture, an incoming or outgoing call connection is initially received by a serving SSP 210 associated with a particular subscriber terminal 40. Since the SSP 210 has no "intelligence" to determine what kind of call treatment should be applied toward the received call connection, the SSP 210 performs a query requesting call treatment instructions to the associated SCP 220 over the connected TCAP link 240.

In order to enable a serving SSP 210 to identify and to perform a query with an associated SCP 220, the directory number assigned to a particular IN subscriber needs to uniquely identify a particular SCP 220 as the serving SCP. As a result, each SCP 220 is pre-allocated with a series of directory numbers, such as a block of a thousand numbers from the NPA-NXX-XXXX number series. Subscribers are then associated with a particular SCP by assigning the pre-allocated directory numbers thereto. Thereafter, by maintaining such a one-to-one relationship between a particular IN subscriber and an SCP via the assigned directory number, the serving SSP 210 is able to identify and to query the correct SCP 220 for IN service. As an illustration, a first SCP 220A stores subscription data representing subscribers one through fifteen (1–15). A second SCP 220B similarly stores subscription data and provides IN services towards subscribers sixteen through thirty (16–30).

In response to an incoming call connection towards a particular subscriber, the serving SSP determines whether the called party subscriber is associated with an IN service. Such a determination is made by performing a B-number analysis on the indicated called party subscriber directory number. The resulting B-number analysis is then associated with data indicating whether the called party subscriber has a trigger activated for an IN category. If the subscriber is not associated with any trigger, an incoming call connection is allowed to be terminated directly towards the called party subscriber. On the other hand, when the called party subscriber has an IN trigger activated, the serving SSP 210 transmits a query signal towards an associated SCP 220. By transmitting the query signal utilizing the directory number associated with the subscriber as the destination address, the signal is properly routed to the associated SCP. The SCP 220, in turn, retrieves the relevant subscriber data, ascertains the appropriate subscriber service to be provided, and instructs the serving SSP 210 to effectuate the desired call treatment. Such instructions may, for example, instruct the serving SSP 210 to reject the call, forward the call to a forward-to-number, connect the call to voicemail, etc.

In order to effectuate a call interception within an IN telecommunications network as shown above, an existing IN trigger, such as a terminating service trigger, needs to be activated within a serving SSP. The serving SSP 210 then queries the associated SCP 220 for routing instructions. The SCP 220, in return, determines that the call needs to be intercepted and instructs the SSP 210 to intercept the received incoming call connection by establishing a circuit connection 110 with the LEAF 100.

Since the above described B-number analysis needs to be effectuated for each incoming call connection to identify the called party subscriber for each call, no redundancy or inefficiency as described in FIG. 1 exists within the IN based telecommunications network. However, such a configuration is still undesirable for a number of reasons. First, in order to ensure uniform interception procedures and services throughout a particular service area, such as a city or state, all SCPs 220 associated therewith need to be updated and maintained with the necessary Service Script Logics (SSLs), executable instructions and/or equipment. As an illustration, where the Federal Bureau of Investigation (FBI) needs to monitor a particular call connection using a different bearer (device) service, all associated SCPs within the coverage area need to be updated with new service logics and equipments. Such updating and maintenance operations are inconvenient.

Furthermore, service providers and associated telecommunications networks are independently operated and maintained. A request for monitoring and screening a particular subscriber therefore needs to be provided to a serving service provider and accordingly input into the associated SCP. Furthermore, numerous service provider employees and systems, such as a Service Management System (SMS), need to be involved in order to effectuate such a request in a conventional system. Not having an independent and consolidated control over associated call connections or communications, the access to the desired SCP 220 may not be convenient or confidential.

As a result, there is a need for a mechanism to efficiently and effectively monitor and intercept call connections within an IN based telecommunications network.

SUMMARY OF THE INVENTION

An indication to effectuate a call connection with a called party subscriber is initially received by an Intelligent Network (IN) based service switching point (SSP) serving said subscriber. Such an indication may include an incoming call setup message, such as an Initial Address Message, towards the subscriber or an outgoing call connection request originated from the subscriber. A B-number analysis is then performed on a directory number associated with the subscriber. If the performed B-number analysis indicates that the subscriber is associated with a first service trigger flag indicative of law enforcement agency monitoring, the serving SSP retrieves a pre-stored network address representing a first SCP from an associated register. The serving SSP then transmits a query signal using the retrieved network address toward the first SCP for routing instructions to connect the received call to a law enforcement monitoring center. If the performed B-number analysis further indicates that the subscriber is associated with a second service trigger flag indicative of conventional IN services, the serving SSP transmits a query signal using the directory number associated with the subscriber towards a second SCP for routing instructions to effectuate the IN services. Utilizing the received routing instructions, the SSP effectuates the instructed telecommunications service accordingly.

In one embodiment of the present invention, the first SCP is a Communications Assistance for Law Enforcement Act (CALEA) SCP serving a plurality of SSPs and the routing instructions instructs the associated SSPs to intercept the call connection for said subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 3:
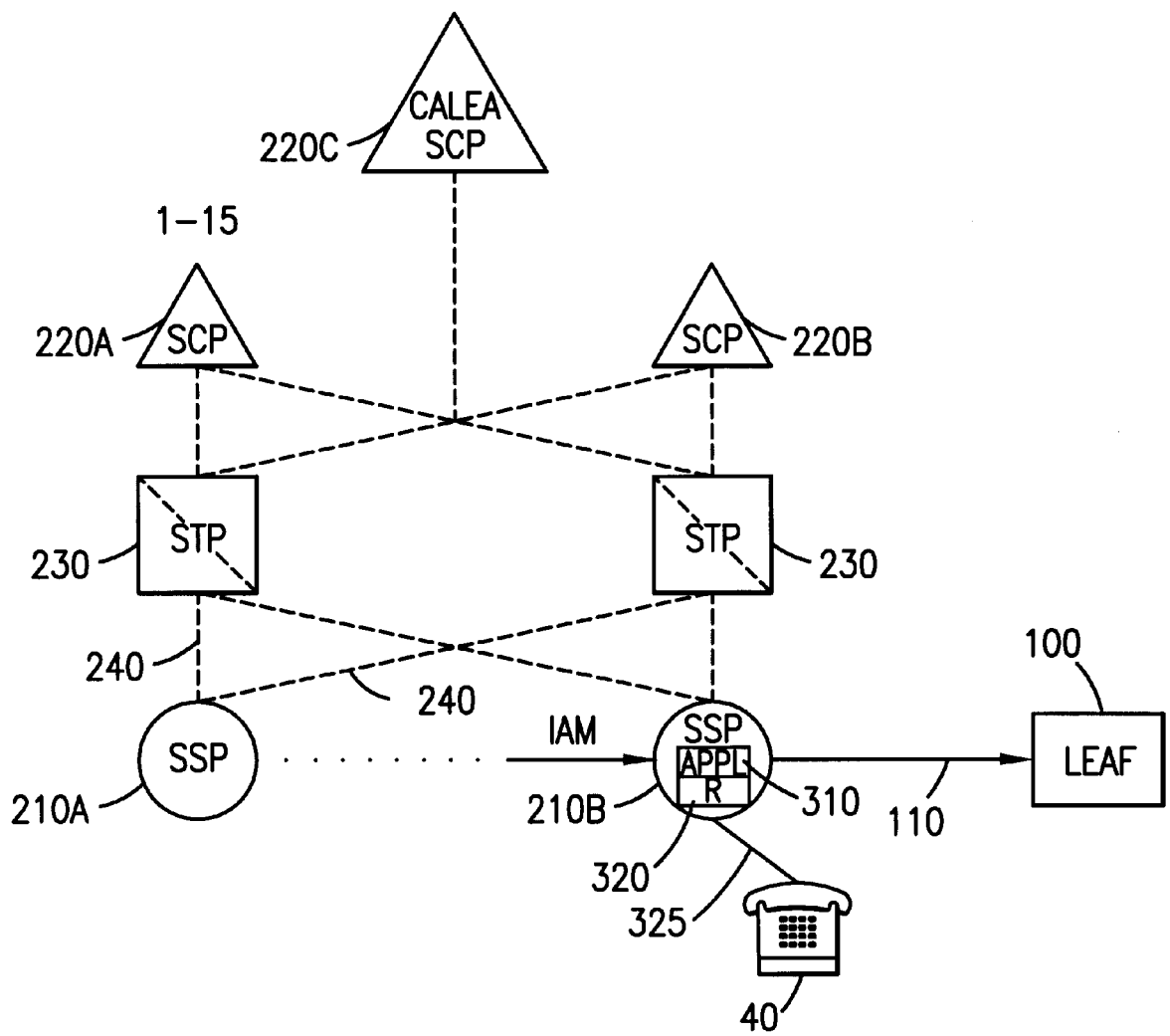
FIG. 3 is a block diagram of an Intelligent Network (IN) illustrating the monitoring of a particular subscriber in accordance with the teachings of the present invention.

FIG. 3 is a block diagram of an Intelligent Network (IN) illustrating the interception of an incoming call connection towards a telecommunications subscriber (or subscriber terminal). In accordance with the teachings of the present invention, a new service control point (SCP) referenced herein as a Communications Assistance for Law Enforcement Act (CALEA) SCP 220C is introduced into the serving IN based telecommunications network. Instead of pre-allocating a series of directory numbers to the CALEA SCP 220C and serving a predefined number of subscribers associated therewith as is done for an SCP in a conventional IN network, the CALEA SCP 220C instead independently provides CALEA service within a particular service area, perhaps with respect to the subscribers associated with many conventional SCPs.

The existing SCPs, such as a first SCP 220A, then serve the associated subscribers (e.g., subscribers 1–15) providing conventional IN services. A second SCP 220B similarly serves the associated subscribers (e.g., subscribers 16–30) providing conventional IN services. The CALEA SCP 220C, on the other hand, is utilized for providing CALEA service for all subscribers (e.g., at least subscribers 1–30) associated within a particular service or geographic area. As a result, regardless of which particular SCP is currently providing the IN services, all call interceptions are effectuated via the CALEA SCP 220C.

An incoming call indication, such as an Initial Address Message (IAM), is initially received by a serving SSP 210B. The received IAM signal includes a calling party directory number (CgPn) identifying the calling party subscriber and a called party directory number (CdPn) identifying the called party subscriber. An application module 310 associated with the serving SSP 210B then performs a B-number analysis against the indicated called party directory number. As a result of performing a B-number analysis, the application module 310 is able to ascertain whether any service trigger flags are currently activated for the called party subscriber. With no activation, no IN subscriber service needs to be provided for the received incoming call connection, and a call connection is allowed to be terminated towards the called party subscriber terminal 40.

On the other hand, for the active trigger flag subscriber, the application module 310 determines the type of service trigger flag activated for the called party subscriber. If the subscriber has a conventional IN subscriber service related flag activated, the serving SSP 210B transmits a query signal to the associated SCP 220A or 220B for routing instructions. As fully described above, the called party directory number is associated with a series of pre-allocated directory number identifying a particular SCP, and by transmitting a query signal utilizing the called party directory number as the destination address, the connected STP 230 is able to appropriately deliver the transmitted query signal to the associated SCP 220. The associated SCP 220 then executes its internal Service Script Logics (SSLs) to properly instruct the local switch, such as the serving SSP 210B, to provide the desired terminating treatment in a conventional manner.

Where the subscriber is associated with a CALEA related trigger flag, in accordance with the teachings of the present invention, the serving SSP 210B transmits a query signal towards the CALEA SCP 220C. Such a query signal is transmitted to the CALEA SCP 220C regardless of which IN SCP 220 is currently associated with the called party subscriber. In response to a determination that the called party subscriber is associated with the CALEA related trigger flag, the application module 310 retrieves a network address representing the CALEA SCP 220C from an associated register (R) 320. The serving SSP then transmits a query signal towards the CALEA SCP 220C utilizing the retrieved network address as the destination address. As a result, the CALEA SCP 220C is invoked and a determination is made as to which law enforcement agency is seeking to intercept this particular call connection. The CALEA SCP 220C then transmits a return signal to instruct the serving SSP 210B to effectuate a communication link 110 with the determined Law Enforcement Agency Facility (LEAF) 100.

Although FIG. 3 is described in the context of an incoming call connection, the system and method of the present invention are applicable to any form, direction, and type of communications. It will then be understood that the description of the present invention in the context of the incoming voice call connection is by way of explanation of the invention rather than of limitation of the scope of the invention. For example, a calling party directory number associated with an outgoing call connection request is similarly analyzed to determine if the subscriber has the CALEA trigger or IN subscriber service trigger flag activated for originating calls. As an illustration, a subscriber terminal 40 originates an outgoing call connection 325 by dialing a particular directory number. The application module 310 associated with the serving SSP 210B, for example, then identifies the calling party subscriber data by either performing a B-number analysis on the calling party directory number and/or called party directory number, or by ascertaining the line circuit associated with the calling party directory number. If the identified data indicates that the calling party subscriber has a CALEA related trigger flag set, the serving SSP 210B similarly transmits a query signal to the associated CALEA SCP 220C to establish a call connection with a law enforcement agency center. An outgoing call connection is thereafter established in a conventional manner.

Figure 1:
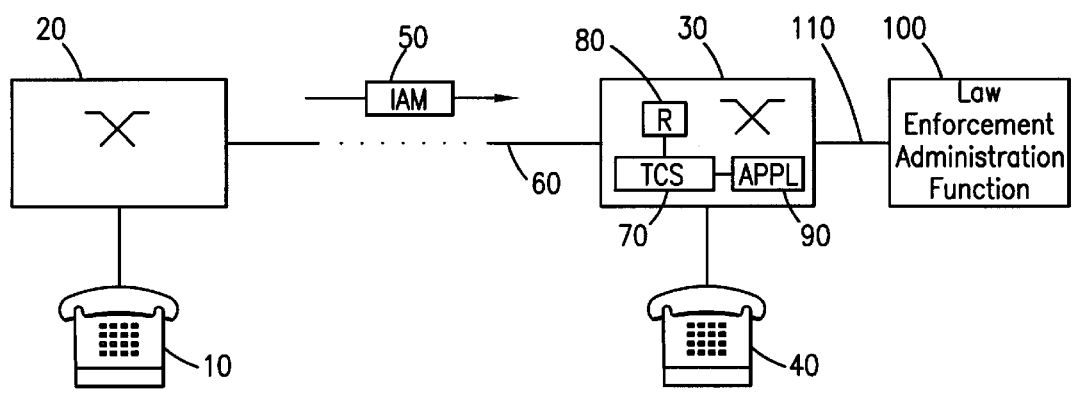
FIG. 1, as described above, is a block diagram of a telecommunications network illustrating the monitoring of a particular subscriber associated thereto.
Figure 2:
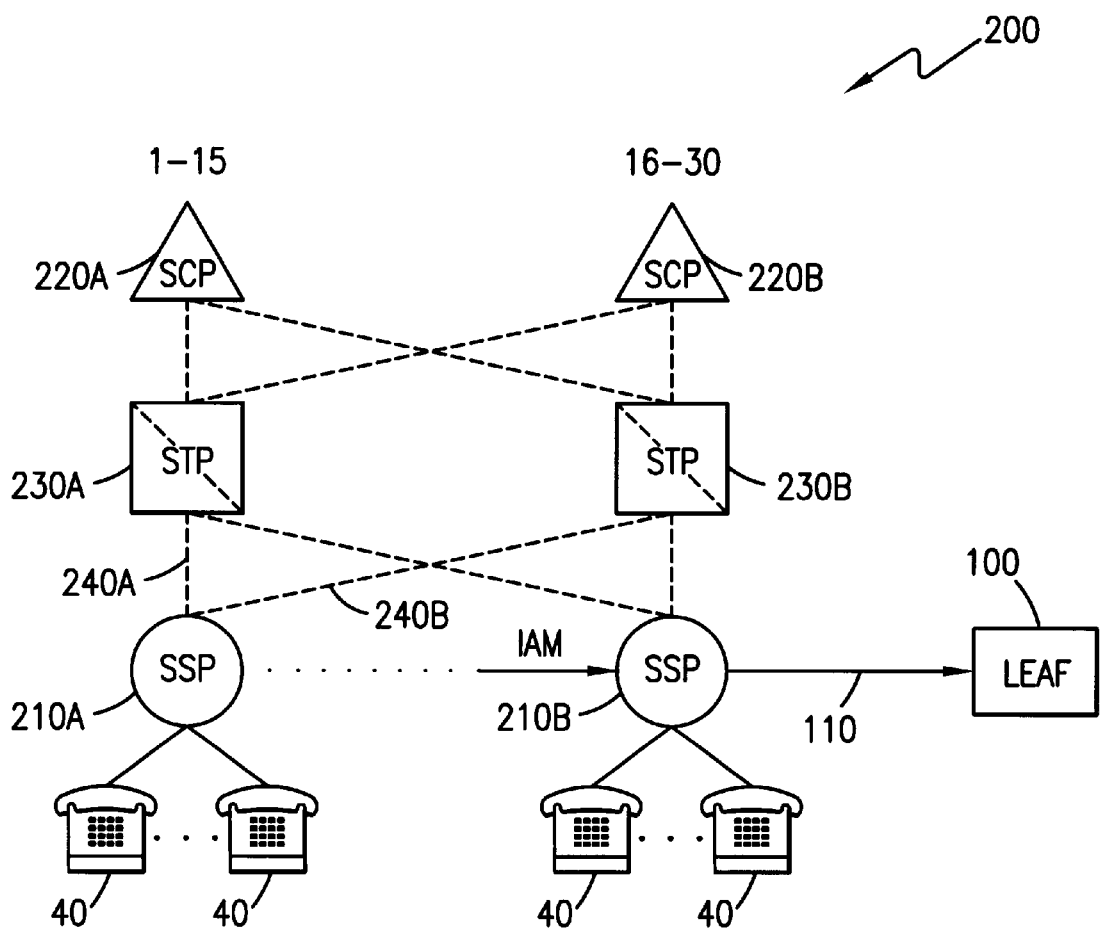
FIG. 2, as described above, is a block diagram of an Intelligent Network (IN) illustrating the provision of IN services to associated subscribers.
Figure 4:
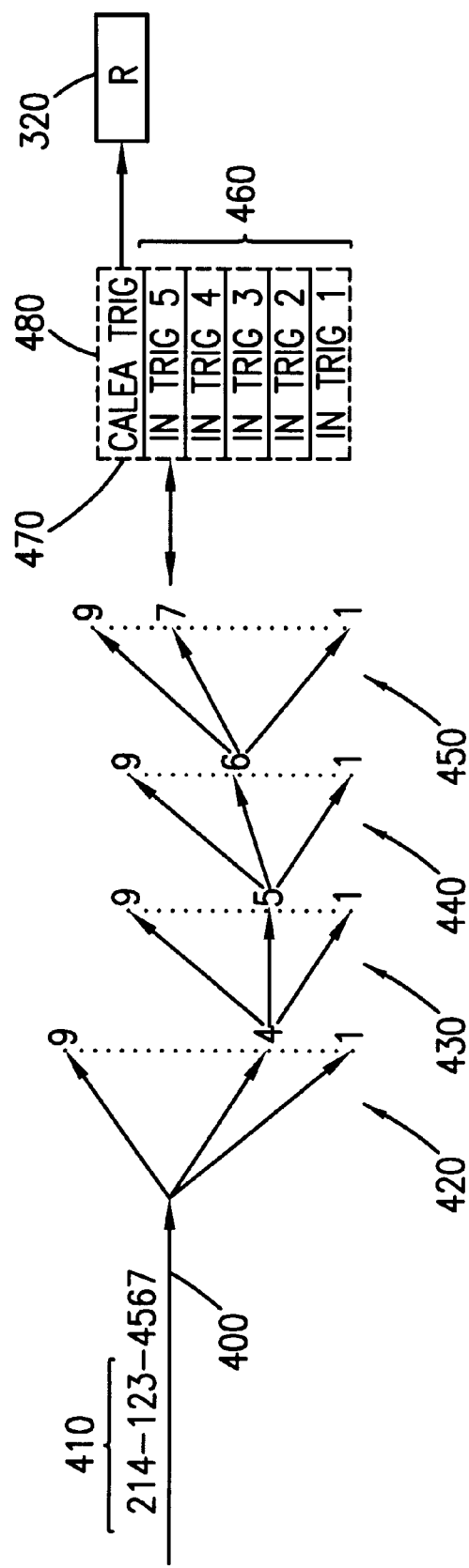
FIG. 4 is a pictorial diagram illustrating a B-number analysis performed within a serving Service Switching Point (SSP)

FIG. 4 is a pictorial diagram illustrating a B-number analysis performed within a serving Service Switching Point (SSP). As an illustration, the serving SSP receives an incoming call connection, such as an Initial Address Message (IAM), requesting a call connection with a particular subscriber terminal. The called party directory number representing the called party subscriber terminal is included within the received IAM signal. As described above in connection with FIG. 2, the called party directory number has the format of NPA-NXX-XXXX (e.g., 214-123-4567). The NPA-NXX value 410 uniquely identifies a particular SSP and SCP associated with the called party subscriber. As a result, by the time the IAM signal is received by the serving SSP, only the last four digits need to be analyzed to identify the called party subscriber. Accordingly, the B-number analysis as shown in FIG. 4 is performed on the last four digits. The first branch 420 identifies digit four (4) as the first number and accordingly branches to the appropriate B-number table. The second branch 430 identifies digit five (5) as the second number and branches to the appropriate B-number table. The third branch 440 then identifies digit six (6) as the third number and further branches to the appropriate B-number table. The last branch 450 identifies digit seven (7) as the last number and then uniquely identifies the associated called party subscriber. For example, the resulting B-number analysis identifies a data table 480 storing data associated with the called party subscriber.

The data table 480 retains data indicative of subscriber features or services including triggers associated with the called party subscriber. In accordance with the teachings of the present invention, a CALEA trigger flag 470 is added to the conventionally provided IN service flags 460 and is activated within the data table 480 with the highest priority. As an illustration, for an incoming call connection, an incoming call interception (CALEA) trigger flag is set for the subscriber. Similarly, for outgoing call connections, an outgoing call interception (CALEA) trigger flag can be separately set for the subscriber. The conventional IN service trigger flags 460, such as an Off-Hook Immediate trigger, Off-Hook Delay trigger, etc., are then enumerated within the data table 480.

When a call connection is divided into a number of stages or states and each state has its own data table 480 assigned therewith, the CALEA trigger flag is further added to the very first stage or state with the highest priority therein. As an illustration, a call progress status within an SSP may be divided into an offhook state, call setup state, call connection state, and call termination state. In accordance with the teachings of the present invention, the CALEA trigger is then added to the offhook state with the highest priority therein.

As fully described above, for the conventional IN triggers 460, the identified directory number is utilized to deliver a query signal to the associated IN SCP. However, where the CALEA trigger 470 is activated for the called party subscriber, the serving SSP instead queries the CALEA SCP for routing instructions. In accordance with the teachings of the present invention, the CALEA trigger 470 is further associated with the register (R) 320 for storing a network address representing the associated CALEA SCP. The serving SSP then retrieves the stored network address and transmits a query signal utilizing the retrieved network address as the destination address.

A similar B-number analysis against the calling party directory number and/or called party directory number may be performed for an outgoing call connection as well. As an illustration, the application module determines the calling party subscriber's directory number and performs a B-number analysis in a similar manner against the determined directory number to ascertain CALEA and IN service triggers activated thereto. Alternatively, for outgoing call connection requests, the serving SSP may be able to identify the calling party subscriber by determining the line card address or port physically associated with the calling party subscriber terminal. The data table 480 may then be associated with the line card address or port to similarly associate the CALEA trigger and IN subscriber service triggers with the calling party subscriber.

Figure 5:
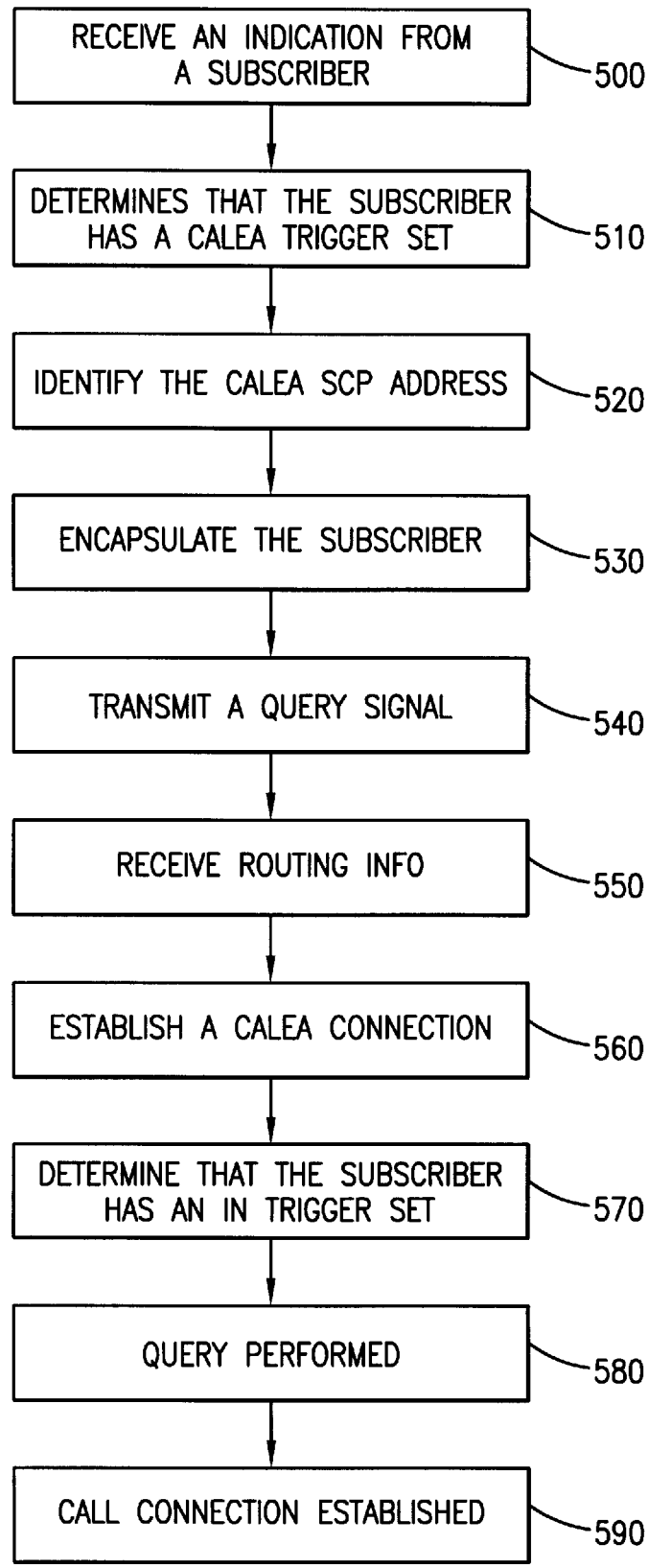
FIG. 5 is a flowchart illustrating the steps performed to effectuate a call interception within an IN based telecommunications network.

FIG. 5 is a flowchart illustrating the steps performed to effectuate a call interception within an IN based telecommunications network in accordance with the teachings of the present invention. An indication to effectuate an call connection or telecommunications service is received by an SSP serving a particular telecommunications terminal at step 500. Such an indication includes an IAM signal for an incoming call connection, an outgoing call connection request originated therein, an off-hook signal indicating that the associated subscriber requesting dial-tone, a service code for requesting a service feature, etc. The serving SSP then performs a B-number analysis on the received called party directory number to determine whether the indicated subscriber has a CALEA trigger flag activated at step 510. As an illustration, for an incoming call connection request, a determination is made as to whether the terminating call interception trigger flag is activated. For an outgoing call connection request, a determination is similarly made as to whether the originating call interception trigger flag is activated.

In response to a determination that an appropriate CALEA related trigger flag is activated, the serving SSP retrieves the network address associated with the CALEA SCP at step 520. The serving SSP then encapsulates the directory number associated with the identified subscriber within a query signal at step 530 and transmits the query signal towards the CALEA SCP using the retrieved network address as the destination address at step 540. In return, the CALEA SCP ascertains which law enforcement agency is currently interested in intercepting this particular call connection and accordingly provides a routing instruction back to the serving SSP at step 550. Utilizing the received routing instructions, the serving SSP then effectuates a call interception with an appropriate interception device for that law enforcement agency at step 560.

After confirming the completion of the communication link with the LEAF, the serving SSP continues to determine whether the subscriber has conventional IN service feature trigger flags activated at step 570. In response to an affirmative determination that the subscriber further has IN service associated therewith, the serving SSP then transmits another query signal, in a conventional manner using the associated directory number, to the conventional IN SCP at step 580. This is to ensure that the subscriber is provided with existing IN services and features to enable the call interception to be transparent. Accordingly, appropriate routing instructions to effectuate conventional IN services are received by the serving SSP and the requested call connection is established thereafter at step 590.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing telecommunications service to a particular subscriber within a telecommunications network, said particular subscriber associated with a serving service switching point (SSP), and the telecommunications network having a first service control point (SCP) designated to provide general service only to a selected group of a plurality of groups of subscribers, wherein the selected group includes the particular subscriber and the telecommunications network further including a second service control point (SCP) designated to provide special services to the plurality of groups of subscribers, said method comprising the steps of:

receiving at said SSP an indication to establish a call connection with said particular subscriber;

determining whether said particular subscriber is associated with a first trigger flag;

in response to a determination that said particular subscriber is associated with said first service trigger flag; querying said first SCP associated with said selected group of subscribers for routing instructions; and providing telecommunications general service in accordance with said queried for routing instructions from said first SCP;

determining whether said particular subscriber is associated with a second trigger flag; and in response to a determination that said particular subscriber is associated with said second service trigger flag:

querying said second SCP associated with plurality of groups of subscribers for routing instructions; and providing telecommunications special service in accordance with said queried for routing instructions from said second SCP.

2. The method of claim 1 wherein said indication comprises an incoming call setup message and said step of determining whether said particular subscriber is associated with said first trigger flag is made by performing a B-number analysis on a called party directory number associated with said incoming call setup message.

3. The method of claim 2 wherein said first service trigger flag comprises a terminating call interception trigger flag associated with said B-number analysis.

4. The method of claim 1 wherein said indication comprises an outgoing call setup message.

5. The method of claim 4 wherein said first trigger flag comprises an originating call interception trigger flag associated with said particular subscriber.

6. The method of claim 1 wherein said step of querying said first SCP for routing instructions further comprises the steps of:

transmitting a query signal from said SSP to said first SCP using a network address associated with said first SCP as the destination address; and encapsulating a directory number associated with said particular subscriber within said query signal.

7. The method of claim 1 wherein said step of querying said second SCP for routing instructions further comprises the step of utilizing a directory number associated with said subscriber to deliver a query signal to said second SCP.

8. The method of claim 1 wherein said queried routing instructions received from said second SCP instructs said first second SSP to intercept said call connection with an intercept device.

9. A method for effectuating a call connection with a particular subscriber within a telecommunications network, and the telecommunications network having a first service control point (SCP) designated to provide general service only to a selected group of a plurality of groups of subscribers, wherein the selected group includes the particular subscriber and the telecommunications network further including a second service control point (SCP) designated to provide special services to the plurality of groups of subscribers, said method comprising the steps of:

receiving an indication to establish a call connection with said particular subscriber;

determining whether said particular subscriber is associated with a subscriber service trigger flag;

in response to a determination that said particular subscriber is associated with a subscriber service trigger flag comprising a call interception trigger flag, communicating with the first service control point (SCP) for routing instructions; and in response to a determination that said particular subscriber is associated with a subscriber service trigger flag comprising an intelligent network service trigger flag, communicating with the second service control point (SCP) for routing instructions.

10. The method of claim 9 wherein said step of determining that said particular subscriber is associated with said call interception trigger flag comprises the step of performing a B-number analysis on a directory number associated with said received indication.

11. The method of claim 10 wherein said indication comprises an incoming call setup request and said directory number comprises a called party number associated with said incoming call setup request.

12. The method of claim 10 wherein said indication comprises an outgoing call setup request from said particular subscriber and said directory number comprises a directory number representing said particular subscriber.

13. The method of claim 9 wherein said call interception trigger flag has a higher priority than said intelligent network service trigger flag.

14. The method of claim 9 further including the steps of:

receiving routing instructions from said first SCP;

establishing a communication link with an interception device indicated within said received routing instructions; and establishing said requested call connection for said particular subscriber, said established call connection further interfaced with said communication link.

15. A system for effectuating a call connection with a particular subscriber terminal within an Intelligent Network (IN) based telecommunications network, comprising:

a service switching point (SSP) connected to said subscriber terminal, said SSP receiving an indication to establish a call connection with said subscriber terminal;

an application module associated with said SSP for performing a B-number analysis for a directory number associated with said indication, said application module further determining whether said directory number is associated with a trigger flag;

an intercept device associated with said telecommunications network for intercepting voice and data communications;

a second service control point (SCP) for providing routing instructions to effectuate said call connection in response to a determination that said directory number is associated with a trigger flag for IN service; and a first service control point (SCP) for providing routing instructions to effectuate a communication link with said intercept device in response to a determination that said directory number is associated with a trigger flag for call interception.

16. The system of claim 15 wherein said indication comprises an incoming call setup message and said directory number is the called party directory number associated with said incoming call setup message.

17. The system of claim 15 wherein said indication comprises an outgoing call setup message received from said particular subscriber terminal, and said directory number includes a subscriber directory number associated with said subscriber terminal.

18. The system of claim 15 wherein said application module receives said routing instructions from said second SCP by transmitting a query signal using said directory number associated with said particular subscriber.

19. The system of claim 15 wherein said application module receives said routing instructions from said second SCP by transmitting a query signal using a network address associated with said first SCP as the destination address and further encapsulating said directory number within said transmitted query signal.

* * * * *

UNITED STATES PATENT AND TRADEMARK OFFICE
CERTIFICATE OF CORRECTION

PATENT NO. : 5,923,744
DATED : Jul. 13, 1999
INVENTOR(S) : Cheng

It is certified that error appears in the above-identified patent and that said Letters Patent is hereby corrected as shown below:

Column 8, line 51    Replace "flag;"
With --flag:--

Signed and Sealed this

Fourteenth Day of December, 1999

Attest:

Attesting Officer

Q. TODD DICKINSON

Acting Commissioner of Patents and Trademarks